United States Patent Office 3,447,905
Patented June 3, 1969

3,447,905
TEST FORMULATION AND DEVICE AND METHOD FOR CREATING AN ACID pH ENVIRONMENT THEREIN
Aeneas J. Shand, Enfield, England, assignor to Miles Laboratories Incorporated, Elkhart, Ind., a corporation of Indiana
No Drawing. Filed Mar. 3, 1967, Ser. No. 620,279
Claims priority, application Great Britain, Mar. 11, 1966, 10,861/66
Int. Cl. G01n 33/00; B01
U.S. Cl. 23—230
17 Claims

ABSTRACT OF THE DISCLOSURE

In a dry test formulation which comprises a composition for detecting certain substances in aqueous fluids but requiring an acid pH environment, the improvement which comprises the inclusion in the formulation of a solid adduct of a Friedel-Crafts salt and an organic Lewis base such as dioxane or pyridine which adduct upon contacting the aqueous fluid releases, in situ, a mineral acid in sufficient quantity to establish the acid pH environment required. A test device comprising the test formulation and a carrier member therefor is also disclosed.

---

In recent years numerous simple test methods have been developed for the rapid and accurate detection of certain constituents in aqueous biological, industrial and other fluids. These methods commonly employ a unitary test reagent composition which, upon contacting a particular constituent in the fluid being tested, results in a chromogenic response. These methods, which are called colorimetric methods of analysis since they depend upon the appearance or disappearance of a color, may be quantitative, semiquantitative or qualitative, depending upon the sensitivity of the method, the level of concentration of the substance being detected, and so forth. Usually the amount of color formed is proportional to the concentration of the substance being detected which allows a quantitation based on a measurement of the color formed or a comparison of the color formed to a standard chart of colors.

Other simplified test procedures and compositions have also been developed which employ chemical responses other than chromogenic to indicate the presence of the substance being detected. These methods depend upon such chemical phenomena as precipitation and enzyme catalyzed reactions, gas formation, coagulation, agglutination, formation of ultraviolet and infrared light absorbing molecules and fluorescense, to mention only a few.

As used hereinafter the term "detecting" or "detection" means both the qualitative and quantitative analysis of a substance in aqueous fluid.

Even simpler methods for detecting substances in aqueous fluid have been developed which utilize a carrier member for the simplified test composition described hereinabove. In such a method the test composition, incorporated with the carrier member is contacted with the fluid being tested and separated therefrom, retaining a small quantity of the aqueous fluid on or in the carrier member. The reaction caused by any substance in the fluid specifically reactable with the test composition is then compared to a standard which may be calibrated directly in concentration of the substance being detected. Usually the carrier member is a bibulous material such as filter paper, wood, cloth and so forth in which the test composition is impregnated, but it may also comprise a strip of plastic to which the test composition or a bibulous material impregnated therewith is adhered. In such a test device, if the reaction is chromogenic, the response is a surface phenomenon when the test composition is adhered to a plastic carrier, but in the devices utilizing a bibulous member the color or lack of color is present throughout the member.

In the aforenoted test systems, the test composition or device is usually retained in a dry state and held in readiness for instant use. In such a condition, the test composition, in the form of tablets, powders, granules or pellets and the device comprising the test composition and a carrier member is usually, for stability reasons, retained in a closed container such as a bottle, foil pack, or plastic envelope.

Of the numerous simplified test compositions which are specific for detecting certain constituents in aqueous fluids, many require an acid pH condition and certain of these, a highly acid pH condition. Other methods require that the acid pH conditon be retained substantially isohydric within a certain limited acid pH range. It will be appreciated that, in the past, the test compositions utilized in these systems have presented serious problems, since the acid pH condition either caused the chemical reagents to decompose, or if this obstacle were overcome and the composition used with a carrier member, the highly acid pH would cause the carrier member to degrade. Discoloration and inactivation of the test system severely limited the universal applicability of these systems, and degradation of the carrier created a degree of unreliability which could not be tolerated.

Examples of the many tests which require an acid pH environment are the following: urobilinogen and indole compounds in biological fluids using Ehrlich's reagent; protein in urine and spinal fluids using the protein error of indicators method; protein in biological fluids using precipitation methods; phenylpyruvic acid using the ferric chloride method; and iron using the ferrocyanide reaction.

It is an object of the present invention to provide in a dry test formulation an in situ means for creating an acid pH environment upon contact with an aqueous fluid.

A further object is to provide a test formulation and device which is substantially chemically neutral until contacted with an aqueous fluid to be tested.

A still further object is to provide a test formulation which includes a composition requiring an acid pH condition for reaction, which is stable and in which the chemical constituents thereof are compatible.

Another object of the invention is to provide a stable test device wherein a carrier member subject to acid degradation is impregnated with a test composition requiring an acid pH environment as well as with means affording said test composition an acid pH environment but only upon contact with an aqueous solution.

Other objects will appear from the ensuing disclosure and the claims appended thereto.

It has now been found that the foregoing objects can be accomplished by utilizing, as the means for creating the acid pH environment in a test composition or device, a solid adduct of a Friedel-Crafts salt and an organic Lewis base. These adducts, upon contacting the aqueous fluid being tested, are hydrolyzed to release a mineral acid, which produces the required acid pH condition. The use of this type of reagent makes it possible to provide a mineral (rather than an organic) acid for the test system using olny solid reagents. It also makes it possible to provide such acid only at the time of utilizing the test composition.

The Friedel-Crafts salts used are those halogen salts employed as catalysts in the classical Friedel-Crafts alkylation reaction. Such compounds include inter alia, stannic chloride, boron trichloride, aluminum chloride, boron trifluoride, zinc chloride and ferric chloride. These compounds are extremely reactive materials and many fume when exposed to a moist atmosphere.

The above noted Friedel-Crafts salts are reacted with an organic Lewis base to form the solid adducts of the present invention. The organic Lewis bases of the present invention include inter alia, pyridine and substituted pyridines, such as α-, β- and γ-picoline, N,N-dialkylalkanolamides, e.g., dimethylformamide and dimethylacetamide, other amides and imides, e.g., benzamide and succinimide, ureas such as sym-dimethylurea, ethers such as dioxane and tetrahydrofuran, nitriles such as acetonitrile and amines, e.g., morpholine.

Because of the reactivity of the Friedel-Crafts salts, the preparation of the adducts of the present invention usually requires admixing the constituents, observing the necessary precautions for an exothermic reaction and recovering the adduct thus formed. If necessary the reactants may be gently heated in order to speed the formation of the solid adduct.

The molar ratio of Friedel-Crafts salt to Lewis base in the formation of the adducts of the present invention depends largely upon the particular salt used. For example, boron, having a coordination number of 4 will form 1:1 adducts with the Lewis base while tin, having a coordination number of 6 will form 1:2 adducts with the Lewis base. This may, however, be varied to a certain extent depending upon the particular organic Lewis base and the variability of the coordination number of the electropositive element in the Friedel-Crafts salt used. These variables are, however, within the purview and experimental scope of one skilled in the art of complex formation.

The adducts of the present invention may be used alone to impart the desired pH condition to the test system or may be incorporated with a neutral or weakly acid salt to form a buffer system. Such a system will keep the pH of the test system substantially isohydric at a predetermined acid pH condition. Suitable salts such as potassium chloride or potassium acid phthalate may be included in the test composition to increase the ionic strength and effectiveness of the released acid as a buffer system. When the acid released is hydrochloric acid and the salt used in conjunction therewith is potassium chloride, then the combined acidifying means becomes the well known Clark and Lubs buffer system formed in situ in the test composition by a dry solid test composition. Such a buffer is extremely effective in buffering the test composition to a pH of from about 1 to 2.

The amount of adduct used in the test composition depends upon the pH desired and the neutralizing effect of the solution being tested and can readily be calculated by one skilled in the art of analytical chemistry. Such a calculation is based on the decomposition of the adduct according to the following scheme which is presented merely as an example and varies according to the individual adduct used:

$$A \cdot BCl_3 + 3H_2O \rightarrow 3HCl + H_3BO_3 + A$$

where A is the organic Lewis base used to prepare the adduct. Thus three moles of hydrochloric acid are released for each mole of adduct used in the above reaction.

The adducts of the present invention may be utilized in the test composition by simply mixing with the other constituents to form an admixed powder which may in turn be used by adding the same to the aqueous fluid to be tested to produce the acid pH condition and the consequent chemical response to the presence of the substance being detected. The admixed powder may also be granulated or formed into tablets for added convenience in use.

Another mode of use involves the impregnation or incorporation of the adduct into or onto a carrier member. This may be done by admixing the adduct with the other constituents and dissolving the mixture in a suitable non-aqueous solvent. An absorbent carrier member may then be dipped into the resulting solution, removed therefrom and dried. If the test composition is such that the constituents are not soluble in a common solvent, then a sequential impregnation technique may be employed. This technique comprises the use of a series of solutions, each containing certain of the test composition constituents. The carrier member is dipped sequentially into the solutions and dried to remove the solvent between the impregnations. The solvent for the test composition containing the adduct of the present invention must be non-aqueous so that hydrolysis with the consequent release of the mineral acid does not take place upon contact of the adduct therewith. Suitable solvents include chloroform, carbon tetrachloride, dimethylsulfoxide, anhydrous alcohol and acetone. Since the solubility of the adducts of the present invention varies, the applicability of the above solvent will likewise vary and each adduct solvent must be selected on its individual physical and chemical properties.

Another mode of use of the adduct of the present invention in conjunction with a carrier member comprises the impregnation of one area of a bibulous strip with the adduct and another area thereof with the remainder of the test composition. For example, the end portion of a bibulous strip may be impregnated with the adduct and an inwardly contiguous area may be impregnated with the remainder of the test formulation. When the impregnated end portion of the strip is dipped into an aqueous fluid and removed, the adduct in said strip portion is hydrolyzed to form a mineral acid which, together with the absorbed fluid, flows into the contiguous area where it reacts with the remainder of the test formulation. By so constructing the test device, the fluid being tested is acidified prior to reaction with the test reagent.

In addition to the test composition ingredients noted above, i.e., the active test reagent system including the adduct, other adjuvants may be utilized to improve the reactivity, appearance, and ability to formulate and manufacture the physical form of the test composition.

The present invention will now be illustrated by the following examples, but is not intended to be limited thereby.

EXAMPLES 1–15

In the following Examples 1–15 the adducts in the following table were prepared and 25 parts combined with 1 part of p-dimethylaminobenzaldehyde to form a dry powdery admixture. About one-half gram of this admixture was added to 2 ml. of a 1 mg./ml. aqueous solution of mesobilirubinogen.[1] In all examples, an immediate rose color formed in the solution.

TABLE

| Ex. | Friedel-Crafts salt | Organic Lewis base | Ratio of salt to base |
|---|---|---|---|
| 1 | Boron trichloride | Pyridine | 1:1 |
| 2 | do | α-Picoline | 1:1 |
| 3 | do | β-Picoline | 1:1 |
| 4 | do | N,N-dimethylformamide | 1:1 |
| 5 | do | N,N-dimethylacetamide | 1:1 |
| 6 | do | Sym-dimethylurea | 1:1 |
| 7 | do | Benzamide | 1:1 |
| 8 | do | Succinimide | 1:1 |
| 9 | do | Dioxane | 1:1 |
| 10 | do | Tetrahydrofuran | 1:1 |
| 11 | do | Acetonitrile | 1:1 |
| 12 | Stannic chloride | Pyridine | 1:2 |
| 13 | do | Morpholine | 1:2 |
| 14 | do | Dioxane | 1:2 |
| 15 | do | Tetrahydrofuran | 1:2 |

---

[1] Mesobilirubinogen and urobilinogen are known to behave in the same way with the above described test system. Examples 1–15 are therefore applicable to a urobilinogen test as well as to a test for mesobilirubinogen.

EXAMPLE 16

Solutions were prepared as follows.

First solution:
Sodium phosphate monobasic
  (NaH$_2$PO$_4$·H$_2$O) _____g__   5.0
  Water _____ml__ 150.0
Second solution:
  Stannic chloride-dioxane adduct [2] _____g__   5.0
  Dimethylsulfoxide _____ml__  17.5
  Chloroform _____ml__   2.5
  p-Dimethylaminobenzaldehyde _____mg__ 100.0

[2] Prepared by mixing approximately one mole of dioxane with two moles of stannic chloride.

Eaton and Dikeman No. 641 filter paper was then immersed in the first solution, removed and allowed to drain and dried at 100° C. for 10–11 minutes. The dried paper was then immersed in the second solution and dried again at 100° C. for 10–12 minutes. The impregnated paper was then cut into small squares which were attached to the end of strips of flexible transparent polystyrene plastic film about ½ cm. x 8 cm.

The test devices thus prepared were immersed in a urine containing 5 mg. percent urobilinogen and removed. The impregnated filter paper immediately turned a rose color.

EXAMPLE 17

An adduct of stannic chloride and dioxane was prepared as in Example 16 and 100 mg. thereof was dissolved in 10 ml. of a 0.1% (weight to volume) solution of tetrabromphenol blue in ethyl alcohol. End portions of strips of filter paper were dipped into this solution, removed, allowed to drain and dried at room temperature. The dried impregnated portion of the filter paper strip was a pinkish-buff color. The strips were then separately immersed into aqueous solutions of albumin having varying concentrations of from 0 to 1000 mg. percent and immediately removed. The strip dipped into the water containing no albumin turned a slightly greenish color while the strip contacting the 1000 mg. percent albumin solution turned a dark blue. Strips contacting 30, 100 and 300 mg. percent solutions of albumin turned intermediate shades of blue-green with the strips contacting the higher concentration albumin solutions turning more blue than green.

EXAMPLE 18

Example 17 was repeated except that dimethylsulfoxide was substituted for the ethyl alcohol as a solvent for the test reagent system. The results were substantially the same as in Example 17 except that the color change upon contacting protein (albumin) was from yellow to green.

EXAMPLE 19

Example 17 was repeated except that acetone was used as the solvent for the test reagent system. The test strips as prepared were white and the color change upon contacting the albumin solutions was from white to green through various shades of yellow-green.

EXAMPLE 20

A solution of 1 gram ferric ammonium sulfate, FeNH$_4$(SO$_4$)$_2$·12H$_2$O, and 1.5 grams magnesium sulfate, MgSO$_4$, in 15 ml. of distilled water was prepared and the end portions of filter paper strips immersed therein, removed and dried at 105° C. for 10 minutes. The impregnated ends of the dried strips were then dipped into a 1% (weight/volume) solution of stannic chloride-dioxane adduct in dimethylsulfoxide. The adduct was prepared as in Example 16. The strips were again dried at 105° C. for 10 minutes. A series of aqueous solutions containing 0, 15, 40 and 100 mg. sodium phenylpyruvate were prepared, and the end portions of the dried strips immersed separately therein. Depending upon the amount of phenylpyruvate present in the solution, the strip changed from yellow to a greyish-green, the strip contacting the solution containing no phenylpyruvate remaining yellow.

What is claimed is:

1. A dry test formulation for detecting a substance in an aqueous fluid which comprises the combination of
  (a) a composition which reacts specifically with the substance to be detected, to form a detectable product, and
  (b) a solid adduct which is hydrolyzable to a mineral acid,
the composition (a) being thus reactable only in an acid pH environment and the solid adduct of (b) being of a Friedel-Crafts salt and an organic Lewis base, the resulting mineral acid providing an acid pH environment for said specific reaction of (a).

2. A test formulation as in claim 1 which additionally comprises a neutral or weakly acid salt to increase the buffer capacity of the mineral acid formed from the adduct.

3. A test formulation as in claim 1 wherein the Friedel-Crafts salt is selected from the group consisting of stannic chloride, boron trichloride, aluminum chloride, boron trifluoride, ferric chloride and zinc chloride.

4. A test formulation as in claim 1 wherein the organic Lewis base is selected from the group consisting of amines, amides, imides, ureas, cyclic ethers and nitriles.

5. A test formulation as in claim 1 wherein the Lewis base is selected from the group consisting of pyridine, α-picoline, β-picoline, γ-picoline, N,N-dimethylformamide, N,N-dimethylacetamide, sym-dimethylurea, benzamide, succinimide, dioxane, tetrahydrofuran, acetonitrile, and morpholine.

6. A test formulation as in claim 1 wherein the substance the composition is specifically reactable with is selected from the group consisting of urobilinogen, bilirubin, mesobilirubinogen, phenylpyruvate and protein.

7. A test device for detecting a substance in an aqueous fluid which comprises a carrier member and a dry test formulation on said carrier, said formulation comprising a composition specifically reactable with said substance but only in an acid pH environment, and a solid adduct of a Friedel-Crafts salt and an organic Lewis base which upon contact with an aqueous fluid is hydrolyzable to a mineral acid which provides an acid pH environment for said composition.

8. A test device as in claim 7 wherein the test formulation additionally comprises a neutral or weakly acid salt to increase the buffer capacity of the adduct.

9. A test device as in claim 7 wherein the Friedel-Crafts salt is selected from the group consisting of stannic chloride, boron trichloride, aluminum chloride, boron trifluoride, ferric chloride and zinc chloride.

10. A test device as in claim 7 wherein the Lewis base is selected from the group consisting of amines, amides, imides, ureas, cyclic ethers and nitriles.

11. A test device as in claim 7 wherein the Lewis base is selected from the group consisting of pyridine, α-picoline, β-picoline, γ-picoline, N,N-dimethylformamide, N,N-dimethylacetamide, sym-dimethylurea, benzamide, succinimide, dioxane, tetrahydrofuran, acetonitrile and morpholine.

12. A test device as in claim 7 wherein the substance the composition is specifically reactable with is selected from the group consisting of urobilinogen, bilirubin, mesobilirubinogen, phenylpyruvate and protein.

13. A method for creating in situ an acid pH environment for an analytical reagent for detecting a substance in an aqueous fluid which comprises contacting with an aqueous fluid said analytical reagent and a solid adduct of a Friedel-Crafts salt and an organic Lewis base which upon contact with said fluid is hydrolyzable to an organic acid.

14. A method as in claim 13 wherein the aqueous fluid additionally contacts a neutral or weakly acid salt to increase the buffer capacity of the mineral acid formed from the adduct.

15. A method as in claim 13 wherein the Friedel-Crafts salt is selected from the group consisting of stannic chloride, boron trichloride, aluminum chloride, boron trifluoride, ferric chloride and zinc chloride.

16. A method as in claim 13 wherein the Lewis base is selected from the group consisting of amines, amides, imides, ureas, cyclic ethers and nitriles.

17. A method as in claim 13 wherein the Lewis base is selected from the group consisting of pyridine, α-picoline, β-picoline, γ-picoline, N,N-dimethylformamide, N,N-dimethylacetamide, sym-dimethylurea, benzamide, succinimide, dioxane, tetrahydrofuran, acetonitrile and morpholine.

References Cited

UNITED STATES PATENTS 2,854,317  9/1958  Free et al.

FOREIGN PATENTS 779,921  7/1957  Great Britain.

MORRIS O. WOLK, *Primary Examiner.*

R. M. REESE, *Assistant Examiner.*

U.S. Cl. X.R.

23—253; 252—408